United States Patent
Zhu

(10) Patent No.: US 9,321,915 B2
(45) Date of Patent: Apr. 26, 2016

(54) SOLVENT-FREE METHOD FOR MAKING ETHYLENE PROPYLENE DIENE POLYMER LATEX

(71) Applicant: LION COPOLYMER GEISMAR, LLC, Geismar, LA (US)

(72) Inventor: Zhiyong Zhu, Baton Rouge, LA (US)

(73) Assignee: LION COPOLYMER GEISMAR, LLC, Geismar, LA (US)

( * ) Notice: Subject to any disclaimer, the term of this patent is extended or adjusted under 35 U.S.C. 154(b) by 115 days.

(21) Appl. No.: 14/165,411

(22) Filed: Jan. 27, 2014

(65) Prior Publication Data

US 2014/0357755 A1  Dec. 4, 2014

Related U.S. Application Data

(60) Provisional application No. 61/829,961, filed on May 31, 2013.

(51) Int. Cl.
| | |
|---|---|
| *C08K 5/06* | (2006.01) |
| *C08L 23/16* | (2006.01) |
| *C08L 33/00* | (2006.01) |
| *C08L 75/04* | (2006.01) |
| *C09D 123/16* | (2006.01) |
| *C09J 123/16* | (2006.01) |

(52) U.S. Cl.
CPC . *C08L 23/16* (2013.01); *C08K 5/06* (2013.01); *C08L 33/00* (2013.01); *C08L 75/04* (2013.01); *C09D 123/16* (2013.01); *C09J 123/16* (2013.01); *C08L 2201/54* (2013.01); *C08L 2312/00* (2013.01)

(58) Field of Classification Search
CPC ........... C08K 5/06; C08L 23/16; C08L 33/00; C08L 75/04; C08L 2201/54; C08L 2312/00; C09D 123/16; C09J 23/16
See application file for complete search history.

(56) References Cited

U.S. PATENT DOCUMENTS

| | | | | |
|---|---|---|---|---|
| 3,998,772 | A | * 12/1976 | Beerbower | C08J 3/07 516/75 |
| 4,788,250 | A | * 11/1988 | Kitahara | C08F 255/06 525/67 |
| 5,985,953 | A | 11/1999 | Lightsey et al. | |
| 6,111,007 | A | * 8/2000 | Rosenbaum | C08F 255/04 524/461 |
| 8,357,733 | B2 | 1/2013 | Wallen et al. | |
| 2009/0234064 | A1 | * 9/2009 | Wang | C08C 1/075 524/552 |

FOREIGN PATENT DOCUMENTS

GB  1333503  * 10/1973

* cited by examiner

*Primary Examiner* — Irina S Zemel
(74) *Attorney, Agent, or Firm* — Buskop Law Group, PC; Wendy Buskop

(57) ABSTRACT

A solvent free method for making an ethylene propylene diene terpolymer latex by blending water with 1 weight percent to 50 weight percent surfactant; blending solvent free ethylene propylene diene terpolymer with the water and surfactant at a low pressure to form a terpolymer mixture; high shear mixing the terpolymer mixture at 0.5 atm to 1.5 atm for 5 minutes to 24 hours at a temperature from 20 degrees Celsius to 100 degrees Celsius to form a solvent free ethylene propylene diene terpolymer latex formation, wherein the solvent free ethylene propylene diene terpolymer latex formation has a viscosity from 1 centipoise to 2000 centipoise; a density from 0.8 to 1.1; and a shelf life of from 7 days to 365 days without separating or stratifying.

21 Claims, 1 Drawing Sheet

| | HLB | Structure | CAS |
|---|---|---|---|
| Triton X100 | 13 | | 9002-93-1 |
| Pluronic® L-35 | 18-23 | | 9003-11-6 |
| IGEPAL® DM-970 | 19 | | 9014-93-1 |
| Pluronic® P-123 | 7-9 | | 9003-11-6 |
| PE-PEG | 4 | | 251553-55-6 |

SOLVENT-FREE METHOD FOR MAKING ETHYLENE PROPYLENE DIENE POLYMER LATEX

CROSS REFERENCE

The present application is a Continuation in Part and claims priority to and the benefit of U.S. Provisional Patent Application Ser. No. 61/829,961 filed on May 31, 2013, entitled "METHOD FOR MAKING A HIGH SOLIDS CROSS-LINKED ETHYLENE PROPYLENE DIENE MONOMER LATEX." This reference is hereby incorporated in its entirety.

FIELD

The present embodiments generally relate to a method for making a stable ethylene propylene diene terpolymer (EPDM) latex without having to dissolve the terpolymer in a hydrocarbon solvent.

BACKGROUND

A need exists for a method of making a solvent free ethylene propylene diene terpolymer latex that has a shelf life of at least 12 days to 365 days without destabilizing or stratifying.

The present embodiments meet these needs.

BRIEF DESCRIPTION OF THE DRAWINGS

The detailed description will be better understood in conjunction with the accompanying drawing as follows:

The FIGURE represents usable surfactants of the method.

The present embodiments are detailed below with reference to the listed FIGURE.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method to make an ethylene propylene diene terpolymer (EPDM) latex usable as a waterproofing material for roofs, a paint, an adhesive, a caulk, and/or a self-curing waterproof coating.

The present embodiments relate to a method to make an ethylene propylene diene terpolymer (EPDM) latex usable as a liquid latex blend and at least one of a butyl latex, acrylic latex, and polyurethane latex.

A low molecular weight ethylene propylene diene terpolymer (EPDM) is used to make a latex without first dissolving the EPDM in a solvent.

This new method eliminates the need to remove solvent later in the production process of the latex, simplifying the latex production process and reducing the manufacture cost and environmental effect.

An additional feature of this invention is that the amount of EPDM can be adjusted to yield various levels of solids content of the final solvent free latex eliminating the need to evaporate water from the latex in order to achieve a high solids latex.

The method involves blending water with 1 weight percent to 30 weight percent surfactant forming a solution.

The method involves blending solvent free ethylene propylene diene terpolymer with the solution at a pressure from 0.5 atm to 1.5 atm without applying any vacuum to the blending process to form a terpolymer mixture.

The solvent free ethylene propylene diene terpolymer is 10 weight percent to 60 weight percent of the total terpolymer weight of the final solvent free ethylene propylene diene terpolymer latex formulation.

It should be noted that the solvent free ethylene propylene diene terpolymer is: (i) 85 weight percent to 99.75 weight percent of a random covalently linked polymer with saturated polymer backbones of ethylene and propylene, the ethylene and propylene have weight ratios from 40:60 to 85:15 of ethylene:propylene respectively, and a molecular weight from 100,000 Mw to 5000 Mw; and (ii) 0.25 weight percent to 15 weight percent of a non-conjugated diene component consisting of at least one of: a methylidene norbornene, a dicyclopentadiene, an ethylidene norbornene, a 1,4-hexadiene, a norbornadiene, and a vinyl norbornene.

The method involves the step of high shear mixing the terpolymer mixture at 0.5 atm to 1.5 atm for 5 minutes to 24 hours at a temperature from 20 degrees Celsius and 100 degrees Celsius to form the solvent free ethylene propylene diene terpolymer latex formation.

The final solvent free ethylene propylene diene terpolymer latex formation has a viscosity from 1 centipoise to 2000 centipoise; a density from 0.8 to 1.1; and a shelf life of from 7 days to 365 days without separating or stratifying.

The method creates a formulation that has significant advantages over commercially available lattices. The method creates a formulation where there is no need to dissolve the EPDM in a hydrocarbon solvent before the EPDM is added to a solution of water and surfactant.

This method enables low amounts of surfactant to be used in the process and low pressure.

The method effectively eliminates the process step of removing the hydrocarbon solvent.

This method has the additional advantage in that the ratio of water to EPDM can be adjusted to obtain a high solids EPDM latex without the need to remove water after the latex is formed.

The following terms are used herein:

The term "adhesive" refers to a formulation used to weld two solid articles together.

The term "cured latex" refers to the cross-linked final EPDM formulation.

The term "EPDM" refers to ethylene propylene diene terpolymers. These EPDM terpolymers have no double bonds in the backbone of the polymer chains and, thus, are less sensitive to oxygen and ozone and have high UV-resistance. In EPDM, the ethylene and propylene copolymers form a saturated polymer backbone with randomly distributed, non-conjugated diene polymers, which provide unsaturations attached to the main chain.

The term "high shear" relates to the use of a high shear mixer. High shear is mixing at greater than 1000 revolutions per minute.

The term "high solids" refers to the total resulting formulation having at least 30 weight percent solids and up to 80 weight percent, as measured by ASTM D 1417-10 for synthetic rubber lattices.

The term "latex" refers to polymers dispersed in water with or without additional solvent.

The term "minimal frothing" refers to an event upon mixing which adds air bubbles to less than 10 percent of the entire latex by volume. The unique formation of this invention is believed to have reduced bubble content, or minimal frothing when mixing at a high shear rate due the surface tension properties of the latex which is created by the combination of physical network junctions including temporary and trapped entanglements of chains formed with the aid of the surfactant.

The term "paint" refers to a formulation that is applied onto a solid to form a decorative or functional surface after evaporation of solvent.

The phrase "percent cross-linked" refers to the density of the cross-links formed in the resulting formulation. A percent cross-linked can be calculated by using the percent solubility of the polymer of the latex in toluene indicating the relative cross-linking of the polymer.

The term "solution" refers to a mixture that a solid dispersed in a continuous liquid medium.

The term "surfactant" refers to a detergent or a dispersant. In embodiments, the surfactant can double as a wetting agent. The surfactant can be a cationic surfactant, an anionic surfactant, a non-ionic surfactant or combinations of these surfactants.

The term "water" refers to deionized water, tap water, distilled water, process water or combinations thereof.

The term "weight percent" refers to the weight percent based on the total formulation of the component.

The surfactant can be cationic surfactant, anionic surfactant, non-ionic surfactant, or combinations thereof.

An example of a usable cationic surfactant is dodecyl ammonium bromide or a tetra-octyl ammonium chloride.

An example of a usable anionic surfactant is a sodium dodecyl benzene sulfonate or a sulfo-succinate such as sodium dioctyl sulfosuccinate, carboxylates, or combinations thereof.

An example of a non-ionic surfactant can be a polyoxyethylene p-t-octylphenol and a polyoxyethylene sorbates.

A solvent free ethylene propylene diene terpolymer (EPDM) component to be blended into the solution of this method can be 10 weight percent to 60 weight percent of the total terpolymer weight of the final solvent free ethylene propylene diene terpolymer latex formulation.

The solvent free ethylene propylene diene terpolymer (EPDM) component is sometimes referenced herein as the "EPDM cement", "EPDM starting material", "dry ethylene propylene diene component", or "dry EPDM component." In embodiments, a dry rubber starting material can be used that is then mixed with a water to create the solvent free ethylene propylene diene terpolymer.

The solvent free EPDM terpolymer component in embodiments, has 4 weight percent to 50 weight percent of a solvent free ethylene/propylene polymer component with a molecular weights from 5000 Mw to 1300000 Mw.

The ethylene propylene polymer component consist of saturated random covalently linked polymers of ethylene and propylene having weight ratios from 40:60 to 85:15 of ethylene:propylene respectively.

The saturated random covalently linked polymers of ethylene and propylene covalently connect to the diene which is no saturated and has active sites for coupling.

In the ethylene propylene diene terpolymer latex, from 0.25 weight percent to 15 weight percent of a non-conjugated diene component can be used to form the ethylene propylene diene terpolymer latex.

In embodiments, the high shear mixing of these ingredients can be performed for a time period ranging from 1 minute to 24 hours at atmospheric pressure to form the ethylene propylene diene terpolymer latex with minimum frothing.

The formed solvent free ethylene propylene diene terpolymer latex has a viscosity from 1 centipoise to 2000 centipoise, a density from 0.8 to 1.1; and a shelf life of from 7 days to 365 days in the absence of ultraviolet light without separating or stratifying.

The invention also relates to a paint incorporating the solvent free ethylene propylene diene terpolymer latex made by this method is contemplated within the scope of this invention.

For example, 10 weight percent to 60 weight percent based on the total formulation of the solvent free ethylene propylene diene terpolymer latex could be incorporated into a paint having 40 percent acrylic resin, 10 percent Titanium Dioxide pigment, 15 percent calcium carbonate filler and 45 percent water.

An adhesive incorporating the solvent free ethylene propylene diene terpolymer latex made by this method is within the scope of this invention.

For example, 10 weight percent to 60 weight percent based on the total formulation of the solvent free ethylene propylene diene terpolymer latex could be incorporated into an adhesive having 30 percent neoprene resin, 35 percent Kaolin clay fillers, 5 percent cross-linker such as a peroxide, and 30 percent water.

A caulk incorporating the solvent free ethylene propylene diene terpolymer latex made by this method is contemplated within the scope of this invention.

For example, 10 weight percent to 60 weight percent based on the total formulation of the solvent free ethylene propylene diene terpolymer latex could be incorporated into a caulk having 40 percent butyl rubber, 35 percent talc, 5 percent titanium dioxide pigment, 8 percent tackifier such as a low molecular weight polybutadiene, and 12 percent water.

The present embodiments relate to a method to make an ethylene propylene diene terpolymer (EPDM) latex usable as a liquid latex blend and at least one of a butyl latex, acrylic latex, and polyurethane latex.

In embodiments, the surfactant can be at least one of a cationic surfactant, anionic surfactant, and non-ionic surfactant.

In embodiments, the cationic surfactant is at least one of: a dodecyl ammonium bromide and a tetra-octyl ammonium chloride.

In embodiments, the anionic surfactant is at least one of: sodium dodecyl benzene sulfonate and sulfo-succinate.

In embodiments, the non-ionic surfactant is at least one of: polyoxyethylene p-t-octylphenol, and a polyoxyethylene sorbate.

The water usable for forming the solution can be a distilled water, a deionized water, a tap water, a process water or combinations of these waters.

In embodiments the solvent free method contemplates adding 0.1 weight percent to 10 weight percent of a curative to the solvent free ethylene propylene diene terpolymer latex formation forming a curable solvent free ethylene propylene diene terpolymer latex.

The curative can be a sulfur, a derivatives of sulfur, a peroxide, a hydroperoxide, a peroxy-carbonate, a thiuram, a thiazole, a dithiocarbamate, a xanthate or combinations of these curatives.

If a curative is used, heat is then applied to the curable solvent free ethylene propylene diene terpolymer latex.

Usable heat is at a temperature ranging from 25 degrees Celsius to 100 degrees Celsius ranging from 10 minutes to 24 hours.

If the curative is used, the heating is at pressure from 0.5 atm to 1.5 atm without an applied vacuum forming a partially cross-linked solvent free ethylene propylene diene terpolymer latex.

The heating achieves from 20 percent to 98 percent cross-linking in the partially cross-linked solvent free ethylene propylene diene terpolymer latex.

In embodiments, the heating can be performed using a heat exchanger, a heat transfer fluid, electrical heat, steam, or combinations thereof.

In embodiments the solvent free method uses 0.1 weight percent to 10 weight percent of a sulfur accelerator in the curative. The amount of sulfur accelerator is based on the total weight percent of the curative.

Usable sulfur accelerators can be zinc diethyldithiocarbamate and zinc benzothiozole.

In embodiments, the solvent free method adds 0.1 weight percent to 3 weight percent based on the final formulation of a defoaming agent to the solution.

In embodiments of the method, a defoaming agent can be: a poly-dimethyl siloxane, a poly-dimethyl siloxane with finely divided silica, such as a DOW CORNING® 1500, or combinations thereof. DOW CORNING® Antifoam 1430 and BYK 021 defoamer available from BYK-Chemie GmbH can also be used herein.

In other embodiments, the solvent free method adds 0.1 weight percent to 3 weight percent based on the final formulation of the defoaming agent to the formed terpolymer mixture.

Usable defoaming agents include silicone glycol, polyethylene glycol, polyacrylate, a poly-dimethyl siloxane, and a poly-dimethyl siloxane with finely divided silica.

In embodiments, the solvent free method 1 weight percent to 5 weight percent of an anti-settling stabilizer based on the total weight percent of the final solvent free ethylene propylene diene terpolymer latex formation to the final formulation.

In embodiments, usable the anti-settling stabilizers are glycerin.

The anti-settling stabilizer can be another surfactant.

In embodiments, the solvent free method adds 0.1 weight percent to 3 weight percent of a biocide based on the total weight percent of the final solvent free ethylene propylene diene terpolymer latex formation to the final formulation.

The biocide in embodiments can be benzisothiazolinone.

A usable biocide is benzisothiazolinone, such as BIOBIT® 20 available from The Dow Chemical Company. The biocide can be antimicrobial, providing antibacterial and antifungal protection. Another usable biocide can be a PROTECTOL® available from BASF.

In embodiments, the solvent free method adds 5 weight percent to 50 weight percent of a filler based on the total weight percent of the final solvent free ethylene propylene diene terpolymer latex formation to the final formulation.

The filler can be one or more of the group: a silica, a talc, a starch, calcium carbonate, and a carbon black.

In embodiments, the solvent free method adds 0.1 weight percent to 20 weight percent of a pigment based on the total weight percent of the final solvent free ethylene propylene diene terpolymer latex formation to the final formulation.

The pigment can be at least one of: an organic dye, carbon black, and a metal oxide.

In other embodiments, the curative can be added in amounts ranging from 0.3 weight percent to 1.76 weight percent based on the final latex formulation.

In other embodiments, the heat can be applied at temperatures from 60 degrees Celsius to 100 degrees Celsius for a period of time ranging from 10 minutes to 60 minutes at atmospheric pressure to partially cross-linked the solvent free ethylene propylene diene terpolymer latex at least 50 percent.

The method of manufacturing the solvent free latex provides a low energy demand to create the solvent free latex formulation because the amount of energy needed is only for crosslinking and is very low compared to other commercial processes.

In embodiments, the latex can be white, clear, opaque, or colored with a pigment, such as carbon black.

When the method creates a latex for use as a sealant coating, the solvent free EPDM latex formulation can seal the exposed edges of roof systems, including splices, T-joints, stepdowns, tie-ins, termination bars, and general flashing details.

When the method creates a cross-linked EPDM latex, the resulting coating has a dynamic tensile modulus greater than non-cross-linked polymers of ethylene propylene polymer coatings. The higher the cross-linking the more improved the dynamic tensile modulus of the final product.

In embodiments, this method provides a final latex formulation which produces a solvent free seal coating with an improved tensile modulus, 50 percent to 500 percent increased tensile modulus, as compared to a non-cross-linked EPDM.

In embodiments, the solvent free EPDM latex produced by the method can dry in the presence of air, forming a solid surface in less than 72 hours.

When the solvent free EPDM formulation made by this method dries, the cured material has a long life, and significant toughness due to the cross-linking of the polymer.

It is theorized that this particular solvent free latex of EPDM can form temporary and trapped entanglements and provide dangling chains, and chain loops that create differences in the distribution of the cross-links creating the advantageous physical properties, of long life, and high density of molecules in a matrix, which provides the improved toughness over other formulations.

The chemical conversion rates, the amount of cross-linking, and chemistry of the bonds, optical spectroscopy, high-resolution NMR, titration of non-reacted functional groups can be used to show the benefits of the invention. The spectroscopic methods are particularly useful for quantitative analysis of cross-links.

The solvent free method can save 70 percent of the energy typically used in forming EPDM coatings and help conserve the planet, providing a highly cross-linked EPDM product with a significantly lower carbon footprint and no change of solvents vaporizing into the atmosphere.

The method is energy efficient, and does not use high heat in the blending or curing providing an energy efficient and cost efficient way to produce the EPDM latex.

These EPDM lattices, when used as additives in paints and outdoor coatings, such as roofing materials, can provide a long lived coating, lasting up to 10 years, while being additionally environmentally friendly by not releasing volatile organic compounds into the atmosphere during application.

This method to manufacture the EPDM latex is economical, safe and usable in applications such as roofing materials, concrete sealants, bridge paint, or similar items.

The cross-linked ethylene propylene diene terpolymer latex method produces low emissions on curing, such as less than 50 g/L, which improves the health of workers applying the coating to a substrate, such as a house, or a boat.

The cross-linked ethylene propylene diene terpolymer latex method results in a formulation that is easy to handle and apply to a substrate, and has an easy flowability at temperatures ranging from 1 degree Celsius to 50 degrees Celsius.

The method produces a latex formulation which has very low volatile organic compound, less than 250 g/L, making this formulation suitable for use in volatile organic compound regulated markets with a latex water based system.

The method produces a formulation that provides excellent adhesion to a variety of substrates, including EPDM membranes, EPDM coatings, metals, wood, and concrete.

It is expected that the final latex made by the method can be stored in unopened packaging at temperatures from 1 degree Celsius to 50 degrees Celsius and have a shelf life of about 12 months when stored as recommended. In embodiments of the formulation that include a biocide, the shelf life can be 24 months.

General Process

Add surfactant and mix to emulsify water.

Add solvent free EPDM with low molecular weight to the emulsified water.

Apply a homogenizer at typically 20,000 RPM for up to 30 minutes to the solution with EPDM added to achieve a stable latex.

Optionally, adjust pH of the homogenized latex with anionic surfactants to achieve better latex stability.

In general, the following FIGURE represents usable surfactants of the method. Non-Ionic surfactants can be one or the combinations described in the FIGURE.

In general, the following represents usable ethylene propylene diene terpolymers (EPDM).

Useable ethylene propylene diene terpolymers (EPDM) with molecular weights (Mw) up to 50K are known as TRILENE™ and available from Lion Copolymer, LLC of Baton Rouge, La.

|  | T65 | T5131 | T66 | T67 |
|---|---|---|---|---|
| Ethylene/Propylene Ratio | 54/46 | 50/50 | 45/55 | 45/55 |
| Mw (from GPC, kDa) | 40 | 21 | 40 | 40 |
| Diene Type | DCPD | DCPD | ENB | ENB |
| Diene weight percent | 9.75 | 10.50 | 4.5 | 9.5 |
| Viscosity at 60° C. | 560 | 230 | 620 | 690 |

The following table represents the usable formulation range:

|  | Range |
|---|---|
| Deionized Water | 40%-80% |
| Terpolymer (Trilene ™) | 18%-45% |
| Surfactant(s) | 2%-15% |
| Total Solids Content | 20%-60% |
| Size to make | 100 mL-1 L |

Example 1

48 grams deionized water and 12 grams of Triton X-100 surfactant available from Sigma-Aldrich were blended. Mechanical stirring was applied until surfactant fully dissolved in the water. All at once 40 grams TRILENE™ T5131 was added and then homogenized for 10 minutes.

The system was emulsified providing a solvent free latex with a solids content at 52 percent a viscosity of 32 centipoise and a density of 1.02.

TRIUNE™ T5131 has a 56:44 ethylene:propylene ratio and 10 weight percent of ethylidene norbornene (ENB).

The high shear mixing to homogenize occurred at 30,000 rpm using a Wiggen Hauser D-500 Shear Power Homogenizer at atmospheric pressure.

This high shear mixing was followed by repeated passes on a GEA Niro Soavi High Pressure Homogenizer known as the PANDA® 2K set at 500 bar until a uniform mixture was formed.

Expected Physical Properties and Characteristics for the Final Latex of Example 1

| EXAMPLE 1 | Typical Values | Test Method |
|---|---|---|
| FINAL FORMULATION | | |
| Color | White | Visual |
| Specific Gravity | 1.02 | ASTM D 1475 |
| Brookfield Viscosity | 32 cps | ASTM D 2196 |
| VOC Content | <50 g/L | ASTM D 2369 |
| Solids Content | 52% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

Example 2

55 grams deionized water and 5 grams of IGEPAL™ DM-970 surfactant available from BASF were blended.

Mechanical stirring was applied until surfactant fully dissolved in the water. All at once 40 g TRILENE™ T51.31 was added and then homogenized for 20 minutes.

The system was emulsified achieving a solvent free latex with a solids content at 45 percent a viscosity of 25 centipoise of and a density of 0.97.

The high shear mixing to homogenize occurred at 30,000 rpm using a Wiggen Hauser D-500 Shear Power Homogenizer at atmospheric pressure.

This high shear mixing was followed by repeated passes on a GEA Niro Soavi High Pressure Homogenizer known as the PANDA® 2K set at 500 bar until a uniform mixture was formed.

| EXAMPLE 2 | Typical Values | Test Method |
|---|---|---|
| FINAL FORMULATION | | |
| Color | White | Visual |
| Specific Gravity | 0.97 | ASTM D 1475 |
| Brookfield Viscosity | 25 cps | ASTM D 2196 |
| VOC Content | <50 g/L | ASTM D 2369 |
| Solids Content | 45% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

Example 3

50 grams tap water and 6 grams of PLURONIC™ L-35 and 4 g PE-PEG surfactant were blended.

Mechanical stirring was applied until surfactant fully dissolved in the water although the solution might be cloudy.

40 g TRILENE™ T65 was added in three equal batches and they homogenized for 10 minutes.

The system was emulsified achieving a solvent free latex with a solids content at 50 percent a viscosity of 360 centipoise a density of 1.04.

The high shear mixing to homogenize occurred at 30,000 rpm using a Wiggen Hauser D-500 Shear Power Homogenizer at atmospheric pressure.

| EXAMPLE 3 | Typical Values | Test Method |
|---|---|---|
| FINAL FORMULATION | | |
| Color | White | Visual |
| Specific Gravity | 1.04 | ASTM D 1475 |
| Brookfield Viscosity | 360 cps | ASTM D 2196 |
| VOC Content | <50 g/L | ASTM D 2369 |
| Solids Content | 50% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

Example 4

80 grams water and 3 grams of IGEPAL™ DM-970 surfactant and 5 grams PE-PEG surfactant were blended.

Mechanical stirring was applied until surfactant fully dissolved in the water. 12 g TRILENE™ T67 was added and then homogenized for 10 minutes after each quantity of TRILENE™ was added. The solution was cloudy.

The system was emulsified achieving a solvent free latex with a solids content at 20 percent a viscosity of 55 centipoise a density of 1.01.

The high shear mixing to homogenize occurred at 30,000 rpm using a Wiggen Hauser D-500 Shear Power Homogenizer at atmospheric pressure.

This high shear mixing was followed by repeated passes on a GEA Niro Soavi High Pressure Homogenizer known as the PANDA® 2K set at 500 bar until a uniform mixture was formed.

| EXAMPLE 4 | Typical Values | Test Method |
|---|---|---|
| FINAL FORMULATION | | |
| Color | White | Visual |
| Specific Gravity | 1.01 | ASTM D 1475 |
| Brookfield Viscosity | 55 cps | ASTM D 2196 |
| VOC Content | <50 g/L | ASTM D 2369 |
| Solids Content | 20% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

Example 5

450 grams deionized water and 1150 grams of IGEPAL™ DM-970.

Mechanical stirring was applied until surfactant fully dissolved in the water. All at once 450 g TRILENE™ T5131 was added and then homogenized for 10 minutes.

The system was emulsified achieving a solvent free latex with a solids content at 45 percent a viscosity of 45 centipoise a density of 0.96.

The high shear mixing to homogenize occurred at 30,000 rpm using a Wiggen Hauser D-500 Shear Power Homogenizer at atmospheric pressure.

| EXAMPLE 5 | Typical Values | Test Method |
|---|---|---|
| FINAL FORMULATION | | |
| Color | White | Visual |
| Specific Gravity | 0.96 | ASTM D 1475 |
| Brookfield Viscosity | 45 cps | ASTM D 2196 |
| VOC Content | <50 g/L | ASTM D 2369 |
| Solids Content | 45% | ASTM C 681 |
| Flash Point (open cup) | In excess of 90 degrees Centigrade | ASTM D 56 |
| Application Properties | | |
| Service Temperature | −50° C. to 100° C. | ASTM D 3359 |
| Application Temp | 1° C. to 50° C. | ASTM C 603 |

The following examples provide a list of ingredients for various embodiments of the present invention.

Example 1

| Water | De-ionized Water | 48% |
|---|---|---|
| Surfactant | Triton X-100 | 12% |
| EPDM | Trilene D5131 | 40% |
| Total Solid | 52% | |
| Viscosity (cP) | 32 | |
| Density | 1.02 | |

Example 2

| Water | De-ionized Water | 55% |
|---|---|---|
| Surfactant | IGEPAL ™ DM-970 | 5% |
| EPDM | Trilene D5131 | 40% |
| Total Solid | 45% | |
| Viscosity (cP) | 25 | |
| Density | 0.97 | |

Example 3

| Water | De-ionized Water | 50% |
|---|---|---|
| Surfactant | Pluronic ™ L-35 | 6% |
| Surfactant | PE-PEG | 4% |
| EPDM | Trilene T65 | 40% |
| Total Solid | 50% | |
| Viscosity (cP) | 360 | |
| Density | 1.04 | |

Example 4

| Water | De-ionized Water | 80% |
|---|---|---|
| Surfactant | IGEPAL ™ DM-970 | 3% |
| Surfactant | PE-PEG | 5% |
| EPDM | Trilene T67 | 12% |
| Total Solid | 20% | |
| Viscosity (cP) | 55 | |
| Density | 1.01 | |

Example 5

| | | |
|---|---|---|
| Water | De-ionized Water | 50% |
| Surfactant | Pluronic ™ L-35 | 6% |
| Surfactant | PE-PEG | 4% |
| EPDM | Trilene T65 | 37% |
| Curative | Sulfur | 0.6% |
| Curative | Zinc Oxide | 1% |
| Curative | Zinc Dibutyl Dithiocarbamate (ZDBC) | 0.8% |
| Curative | Zinc Mercapto Tolunithiazole (ZMTT) | 0.6% |
| Total Solid | | 50% |
| Viscosity (cP) | | 550 |
| Density | | 1.02 |

Example 6

| | | |
|---|---|---|
| Water | De-ionized Water | 50% |
| Surfactant | Pluronic ™ L-35 | 6% |
| Surfactant | PE-PEG | 4% |
| EPDM | Trilene T65 | 35% |
| Curative | Luperox 101 | 5% |
| Total Solid | | 50% |
| Viscosity (cP) | | 500 |
| Density | | 1.02 |

Example 7

| | | |
|---|---|---|
| Water | De-ionized Water | 50% |
| Surfactant | Pluronic ™ L-35 | 6% |
| Surfactant | PE-PEG | 4% |
| EPDM | Trilene T65 | 35% |
| Curative | Luperox 101 | 3% |
| Curative | Zinc diethyldithiocarbamate | 2% |
| Total Solid | | 50% |
| Viscosity (cP) | | 520 |
| Density | | 1.02 |

Example 8

| | | |
|---|---|---|
| Water | De-ionized Water | 25% |
| Surfactant | Pluronic ™ L-35 | 3% |
| Surfactant | PE-PEG | 2% |
| EPDM | Trilene T65 | 21.2% |
| Filler | CaCO3 | 30% |
| Defoamer | BYK 021 | 0.1% |
| Anti Settling Agent | Glycerin | 1% |
| Biocide | BIOBIT ® 20 | 0.1% |
| Pigment | Koronos 2300 TiO2 | 20% |
| Total Solid | | 75% |
| Viscosity (cP) | | 3600 |
| Density | | 1.04 |

Example 9

| | | |
|---|---|---|
| Water | De-ionized Water | 30% |
| Surfactant | Pluronic ™ L-35 | 3.6% |
| Surfactant | PE-PEG | 2.4% |
| EPDM | Trilene T65 | 26% |
| Filler | Fumed Silics | 30% |
| Defoamer | BYK 021 | 3% |
| Anti Settling Agent | Glycerin | 1% |
| Biocide | BIOBIT ® 20 | 3% |
| Pigment | Koronos 2300 TiO2 | 1% |
| Total Solid | | 70% |
| Viscosity (cP) | | 2800 |
| Density | | 1.04 |

Example 10

| | | |
|---|---|---|
| Water | De-ionized Water | 35% |
| Surfactant | Pluronic ™ L-35 | 3% |
| Surfactant | PE-PEG | 2.8% |
| EPDM | Trilene T65 | 28% |
| Filler | CaCO3 | 1% |
| Defoamer | BYK 021 | 0.1% |
| Anti Settling Agent | Glycerin | 10% |
| Biocide | BIOBIT ® 20 | 0.1% |
| Pigment | Koronos 2300 TiO2 | 20% |
| Total Solid | | 65% |
| Viscosity (cP) | | 2200 |
| Density | | 1.02 |

Example 11

| | | |
|---|---|---|
| Water | De-ionized Water | 28.8% |
| Surfactant | Pluronic ™ L-35 | 3% |
| Surfactant | PE-PEG | 4% |
| EPDM | Trilene T65 | 35% |
| Curative | Sulfur | 0.6% |
| Curative | Zinc Oxide | 1% |
| Curative | Zinc Dibutyl Dithiocarbamate (ZDBC) | 0.8% |
| Curative | Zinc Mercapto Tolunithiazole (ZMTT) | 0.6% |
| Filler | Fumed Silics | 15% |
| Defoamer | BYK 021 | 0.1% |
| Anti Settling Agent | Glycerin | 1% |
| Biocide | BIOBIT ® 20 | 0.1% |
| Pigment | Koronos 2300 TiO2 | 10% |
| Total Solid | | 71% |
| Viscosity (cP) | | 3000 |
| Density | | 1.04 |

While these embodiments have been described with emphasis on the embodiments, it should be understood that within the scope of the appended claims, the embodiments might be practiced other than as specifically described herein.

What is claimed is:

1. A solvent free method for making a solvent free ethylene propylene diene terpolymer latex formulation, the method comprising:
   a. blending water with 1 weight percent to 50 weight percent surfactant forming a solution;
   b. blending solvent free ethylene propylene diene terpolymer with the solution at a pressure from 0.5 atm to 1.5 atm without an applied vacuum to form a terpolymer mixture, wherein solvent free ethylene propylene diene terpolymer is 10 weight percent to 60 weight percent of the total terpolymer weight of a final solvent free ethylene propylene diene terpolymer latex formation;
   wherein the solvent free ethylene propylene diene terpolymer comprises:
   (i) 85 weight percent to 99.75 weight percent of a random covalently linked polymer with saturated polymer backbones of ethylene and propylene, the ethylene and propylene having weight ratios from 40:60 to 85:15 of ethylene:propylene respectively, and a molecular weight from 100000 Mw to 5000 Mw; and
(ii) 0.25 weight percent to 15 weight percent of a non-conjugated diene component consisting of at least one of: a methylidene norbornene, a dicyclopentadiene, an ethylidene norbornene, a 1,4-hexadiene, norbornadiene, and a vinyl norbornene; and
c. high shear mixing the terpolymer mixture at from 0.5 atm to 1.5 atm for 5 minutes to 24 hours at a temperature from 20 degrees Celsius to 100 degrees Celsius to form a final solvent free ethylene propylene diene terpolymer latex formation, wherein the final solvent free ethylene propylene diene terpolymer latex formation has a viscosity from 1 centipoise to 2000 centipoise; a density from 0.8 to 1.1; and a shelf life of from 7 days to 365 days without separating or stratifying.

2. The solvent free method of claim 1, wherein the surfactant is at least one of: cationic surfactant, anionic surfactant, and non-ionic surfactant.

3. The solvent free method of claim 2, wherein the cationic surfactant, if used is at least one of: a dodecyl ammonium bromide and a tetra-octyl ammonium chloride, the anionic surfactant, if used is at least one of: sodium dodecyl benzene sulfonate and sulfo-succinate; and the non-ionic surfactant, if used is at least one of: a polyoxyethylene p-t-octylphenol and a polyoxyethylene sorbate.

4. The solvent free method of claim 1, wherein the water for forming the solution is at least one of: distilled water, deionized water, tap water, and process water.

5. The solvent free method of claim 1, further comprising adding 0.1 weight percent to 10 weight percent of a curative based on the total weight percent of the final solvent free ethylene propylene diene terpolymer latex formation to the final solvent free ethylene propylene diene terpolymer latex formulation forming a curable solvent free ethylene propylene diene terpolymer latex.

6. The solvent free method of claim 5, further comprising applying a heating to the curable solvent free ethylene propylene diene terpolymer latex at a temperature ranging from 25 degrees Celsius to 100 degrees Celsius ranging from 10 minutes to 24 hours, at a pressure from 0.5 atm to 1.5 atm without an applied vacuum forming a partially cross-linked solvent free ethylene propylene diene terpolymer latex formulation.

7. The solvent free method of claim 6, wherein in the heating achieves from 20 percent to 98 percent cross-linking in the partially cross-linked solvent free ethylene propylene diene terpolymer latex formulation.

8. The solvent free method of claim 5, adding 0.1 weight percent to 10 weight percent of a sulfur accelerator into the curative based on the total weight percent of the curative.

9. The solvent free method of claim 1, further comprising adding 0.1 weight percent to 3 weight percent of a defoaming agent to the solution based on the total weight percent of the final solvent free ethylene propylene diene terpolymer latex formation or adding the defoaming agent to the terpolymer mixture.

10. The solvent free method of claim 9, wherein the defoaming agent is at least one of: a silicone glycol, a polyethylene glycol, a polyacrylate, a poly-dimethyl siloxane, and a poly-dimethyl siloxane with finely divided silica.

11. The solvent free method of claim 1, further comprising adding 1 weight percent to 5 weight percent of an anti-settling stabilizer to the final solvent free ethylene propylene diene terpolymer latex formation based on the weight percent of the final solvent free ethylene propylene diene terpolymer latex formation.

12. The solvent free method of claim 1, further comprising adding 0.1 weight percent to 3 weight percent of a biocide to the final solvent free ethylene propylene diene terpolymer latex formation based on the total weight percent of the final solvent free ethylene propylene diene terpolymer latex formation.

13. The solvent free method of claim 1, further comprising adding 5 weight percent to 50 weight percent of a filler to the final solvent free ethylene propylene diene terpolymer latex formation based on the total weight percent of the final solvent free ethylene propylene diene terpolymer latex formation.

14. The solvent free method of claim 1, further comprising adding 0.1 weight percent to 20 weight percent of a pigment to the final solvent free ethylene propylene diene terpolymer latex formation based on the total weight percent of the final solvent free ethylene propylene diene terpolymer latex formation.

15. The solvent free method of claim 6, wherein the heating can be performed using a heat exchanger, a heat transfer fluid, electrical heat, steam, or combinations thereof.

16. The solvent free method of claim 5, wherein the curative is selected from the group consisting of: sulfur, derivatives of sulfur, peroxide, hydroperoxide, peroxy-carbonate, thiuram, thiazole, dithiocarbamate, and xanthate.

17. The solvent free method of claim 8, wherein the sulfur accelerator is selected from the group consisting of: zinc diethyldithiocarbamate and zinc benzothiozole.

18. The solvent free method of claim 11, wherein the anti-settling stabilizer is glycerin.

19. The solvent free method of claim 12, wherein the biocide is benzisothiazolinone.

20. The solvent free method of claim 13, wherein the filler is selected from the group consisting of: a silica, a talc, a starch, a calcium carbonate, and a carbon black.

21. The solvent free method of claim 14, wherein the pigment is selected from the group consisting of: an organic dye, a carbon black, and a metal oxide.

* * * * *